United States Patent Office 3,277,210
Patented Oct. 4, 1966

3,277,210
PROCESS OF FORMING A HOMOGENEOUS COMPOSITION OF ETHYLENE HOMOPOLYMER AND ETHYLENE-VINYL ACETATE BLOCK COPOLYMER
Frank A. Mirabile, Wayne, N.J., and Frank X. Werber, Rockville, Md., assignors to W. R. Grace & Co., New York, N.Y., a corporation of Connecticut
No Drawing. Filed Sept. 3, 1963, Ser. No. 306,334
5 Claims. (Cl. 260—878)

This invention relates to reaction products of polyethylene and vinyl acetate and a method of preparing same.

This application is a continuation-in-part of application having Serial No. 816,388, filed May 28, 1959 now abandoned.

It is known that the products obtained from reacting compounds of transition elements, preferably halides of titanium, found in Groups IVB–VIB inclusive of the Periodic Table of Elements with metallic reducing agents such as metal alkyls are active ethylene polymerization catalysts which under proper conditions cause the formation of high molecular weight polymers. See Belgian Patent 533,362, issued November 16, 1954 to K. Ziegler which patent discloses the use of salts of metals of the group consisting of Ti, Zr, Hg, V, Nb, Ta, Cr, Mo and W in combination with an organic-metallic reducing agent such as aluminum trialkyl. These catalysts are referred to as coordination catalysts on the theory that the reduced transition element or the metallic reducing agent forms coordinate bonds with the ethylene thereby causing the formation of linear polyethylene relatively free of branching.

The disadvantage of using coordination catalyst, however, lies in the fact that they leave a portion of the metallic catalyst residues bonded to or admixed with the polyethylene formed. See G. Natta's and G. Mazzanti's article in Tetrahedron, vol. 8, pp. 86–100, Pergamon Press, N. Ireland (1960). Such bonded metallic residues cause discoloration and degradation of the polymer on heating. Since their presence in the polymer has been deemed undesirable, those skilled in the art have invented many systems to accomplish their removal, e.g., see Canadian 568,722, Brightbill et al., issued January 6, 1959.

Surprisingly, we have now found that the presence of said metallic catalyst residues in polyethylene are useful in copolymerizing polyethylene with a vinyl monomer such as vinyl acetate in the presence of oxygen.

Summarily, this invention is directed to polymerizing ethylene in the absence of oxygen in an inert liquid hydrocarbon solvent at a temperature in the range 20 to 250° C., and a pressure in the range of atmospheric to 1000 p.s.i. or higher in the presence of a catalyst consisting essentially of an organo-metallic compound containing a metal-carbon bond, the metallic component of which being selected from Groups IA, IIA and IIIA and a metallic compound of transition elements in Groups IVB, VB and VIB, all of said groups being in the Periodic Table of Elements (Handbook of Chemistry, Lange, Handbook Publishers, Inc., 5th ed., pages 54–55) and thereafter with the polyethylene still containing the metallic catalyst residue bonded to its terminal carbon atom in a carbon-metal bond and preferably in situ, forming a copolymer of ethylene and vinyl acetate by adding vinyl acetate and oxygen as the sole effective catalyst at atmospheric pressure and a temperature of 20–70° C. Higher temperatures are operable if sufficient pressure is used to maintain the vinyl acetate in the liquid phase.

The interpolymerization of ethylene and vinyl acetate is old in the art, see British Patent 497,643, issued December 22, 1938. The interpolymers formed are composed of linear chain polymers in which the ethylene groups are interdisposed with vinyl acetate groups in random alternation. Such interpolymers, however, have solubility properties intermediate between the monomers comprising the interpolymer with the result that solubility properties each homopolymer per se has as a homopolymer are greatly modified. One of the objects of the instant invention is to produce a copolymer, a linear portion of which, exhibits solubility properties of the ethylene homopolymer and the remaining portion evidences solubility properties of the vinyl acetate homopolymer.

Throughout the specification, when reference is made to an ethylene-vinyl acetate copolymer it means one wherein the essentially linear chain of ethylene which is attributed to polyethylene is maintained substantially intact and the subsequently polymerized vinyl acetate polymer groups are attached to the linear polyethylene chain at the terminus thereof. This results in a copolymer having the structure P–P–P–P–P–P–P–V–V–V wherein P represents the ethylene portion of the copolymer and V represents the vinyl acetate portion. This is so since the linear polyethylene is formed prior to the reaction with vinyl acetate in the presence of oxygen.

The exact mechanism of this novel copolymerization reaction is not fully known. It is known that under the preferred copolymerization conditions, i.e., 20 to 70° C. and atmospheric pressure, any vinyl acetate homopolymerization is due to a thermal polymerization and not to an oxygen catalyzed polymerization especially at the upper limit of the preferred temperature range. Since it is known that a carbon-metal bond is more reactive to oxygen than a carbon hydrogen bond, the metal atoms attached to the ethylene polymer terminus i.e.

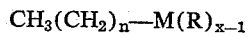

where M is a metal from Group IA–IIIA or Group IVB–VIB inclusive, $x$ is the valence of the metal M, and R is an alkyl react with $O_2$ to form:

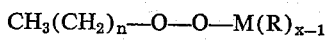

an unstable polyethylene metal peroxide. This unstable intermediate on decomposition forms:

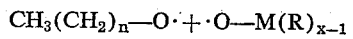

classified as polyethylene oxy free radicals and metal oxy free radicals. Both of the above radicals afford active sites to initiate vinyl acetate polymerization. The vinyl acetate polymer formed on the polyethylene-oxy free radical results in the copolymer of ethylene-vinyl acetate of this invention. The metal-oxy free radical initiates homopolymerization of vinyl acetate. However, we do not wish to be bound by any theory, suffice it to say, that upon formation of polyethylene by subjecting ethylene to a catalyst consisting essentially of an organo-metallic compound containing a metal-carbon bond, the metallic element of which being a member of Group IA–IIIA and a metallic compound of transistion elements in Group IVB–VIB in the Periodic Table, the addition of vinyl acetate and oxygen causes the formation of an ethylene-vinyl acetate copolymer at substantially atmospheric pressure.

The salient novel features of this invention are the structure of the copolymer formed, the use of oxygen as the sole catalyst added to form the copolymer, the relative speed of the reaction, and the presence of the metallic catalyst residue at the terminaus of the polyethylene chain. Prior art methods of forming copolymers of vinyl acetate and ethylene using oxygen as a catalyst require initiators to induce the oxygen to form hydroperoxides along the polyethylene backbone. The backbone and not the terminus is the situs of attack since oxygen will preferentially attack a methylene group prior to terminal groups such as methyl or vinyl in commercially available polyethylene which have the catalyst residue removed therefrom. This oxidation step to form hydroperoxides along the backbone of the polymer chain is relatively slow and results in hydroperoxides of high stability. In order to induce decomposition of the stable hydroperoxides formed into free radical polymerization sites, it is necessary to further add a redox reducing agent such as ferric acetylacetonate or triethylamine. The copolymer resulting from the aforestated prior art system is a graft copolymer, i.e., an ethylene backbone with vinyl acetate grafted along the ethylene backbone. The prior art process is obviously stepwise, requires other catalysts than solely oxygen and the oxygen must be added to the polyethylene prior to the vinyl acetate to ultimately form graft copolymer since oxygen per se is not a catalyst for vinyl acetate. See Schildknecht, Vinyl and Related Polymers, pp. 327–30, John Wiley & Sons Inc., New York 1952. The presence of the metallic catalyst residue bonded to the polyethylene thru a carbon-metal bond is the sine qua non of applicant's invention. The carbon-metal between the polyethylene and the metallic residue of the Ziegler type catalyst causes the following steps to occur:

(1) It establishes a situs for preferential formation of an unstable metallic peroxide at the terminus of the polyethylene;

(2) The instability of the metallic peroxide formed under the polymerization conditions disclosed herein causes the formation of a free radical site at the terminus of the polyethylene chain:

(3) Said free radical at the terminus of the polymer chain catalyzes the polymerization of vinyl acetate resulting in a copolymer of ethylene with vinyl acetate attached at its terminus.

It should be understood that although reference is made specifically throughout the specification to $TiCl_4$ as the transition metal compound, any metallic compound of a transition element in Group IVB to VIB inclusive which is suitable as an ethylene polymerization catalyst as disclosed in the aforementioned Belgian patent and which forms coordinate bonds with the ethylene is operable in the practice of the instant invention. Additionally, it is to be understood that where reference is made to an aluminum tri (lower) alkyl in this invention, any organometallic wherein the metal is selected from Group IA, IIA, and IIIA can be substituted therefore and is intended.

The process for the polymerization of ethylene can be carried out over a wide range of conditions. It is operable at polymerization temperatures ranging from 20 to 250° C. and higher, preferably 50 to 200° C. Also, when using the catalyst of this invention, to polymerize ethylene, pressures in the polymerization reactor may vary from atmospheric to 1000 atmospheres. Preferably, the pressure is in the range from atmospheric to 600 p.s.i.

Although the ethylene polymerization reaction is performed in the presence of a solvent, the subsequent copolymerization reaction is operable in the absence of a solvent or in the presence of the same solvent used in the ethylene polymerization reaction or even a different solvent. If a solvent is used it should be one which is inert to the reactions and remains liquid under the temperature and pressure conditions employed. The preferred class of solvents are inert liquid hydrocarbon solvents, e.g., pentane, hexane, heptane, cyclohexane, octane, benzene, xylene and toluene.

The ratio of the ethylene polymerization catalyst components may be varied considerably. Thus a $TiCl_4$:aluminum tri (lower) alkyl molar ratio of 1:0.5 to 100 is operable, preferably a molar ratio range of 1:0.5 to 3 respectively is employed. The amount of the ethylene polymerization catalyst is not critical. Relatively small amounts are adequate to form relatively large amounts of ethylene polymer. In general, a practical range is 0.001 to 1 g. of catalyst per gram of ethylene polymerized. Larger amounts of catalyst are operable but unnecessary.

The ethylene polymerization catalyst can be added simultaneously or stepwise with the addition of the aluminum tri (lower) alkyl preceding the $TiCl_4$ addition.

To insure the catalytic activity of the ethylene polymerization catalyst components it is necessary that they be maintained free from contact with contaminants which tend to deactivate or poison the catalyst until the ethylene polymerization reaction is completed. Such contaminants include oxygen, moisture, carbon dioxide, and the like. To preserve freedom from contaminants, the aluminum tri (lower) alkyl and $TiCl_4$ are transferred from their storage vessels to the polymerization reaction under a slight pressure of a gas inert to the catalyst. In the example stated herein, pure dry lamp-grade nitrogen is used as the inert gas, however, the noble gases, especially argon and helium are equally suitable.

Following the ethylene polymerization, the system is generally vented of unreacted ethylene in solution. This is done prior to the addition of the oxygen catalyst to insure that a subsequent purification step to remove oxygen from the unreacted ethylene is not necessary prior to its reuse. The copolymerization is generally, but not necessarily performed in situ. However, preformed solid polyethylene, containing metallic catalyst residue bonded thereto at its terminus, can be redissolved in order to carry out the copolymerization reaction at another location at a subsequent date, if desired.

The copolymerization reaction in the presence of an oxygen catalyst is operable under various conditions. Thus the copolymerization reaction may be performed under the same conditions of temperature as the ethylene polymerization, i.e. 20 to 250° C. Preferably 20–70° centigrade is used to decrease thermal homopolymerization of vinyl acetate. It is not necessary that the ethylene polymer formed precipitate out of solution prior to the copolymerization reaction; so long as the metal catalyst is bonded to the polymer in solution the copolymerization reaction with vinyl acetate will occur. All things being equal, the greater the number of polyethylene chains having metallic residue bonded thereto, which afford free radical sites after oxidation, the greater the number of copolymer chains formed.

The percent of vinyl acetate in any copolymer molecule can vary within wide limits. For example it is possible to preform low molecular weight polyethylene having metallic catalyst residue bonded to the terminus of each chain and thereafter propagate long chains of vinyl acetate at the terminus of the polyethylene to form a copolymer which is predominantly vinyl acetate. On the other hand one could start with high molecular weight polyethylene and quickly terminate the propagation of vinyl acetate thereby forming a copolymer which contains predominantly ethylene in the copolymer molecule. Thus it is possible to form a copolymer of ethylene and vinyl acetate by the instant invention wherein the weight of vinyl acetate in the copolymer ranges from 0.5 to 60% or more depending on the desired end use of the copolymer.

Preferably the copolymerization is carried out at atmospheric pressure although superatmospheric pressure is operable if desired.

Since oxygen is a known poison for the Ziegler type catalyst, its addition to the polymerization reactor is withheld until the ethylene polymerization is complete, and unreacted ethylene is vented from the system. The oxygen is then added simultaneously with the vinyl acetate monomer. Instead of oxygen, it is possible to use air as the copolymerization catalyst in performing the instant invention; however, since the $O_2$ content of air is low, a proportionately larger volume of air must be used. The amount of oxygen necessary to achieve the copolymerization can be varied between 0.01 to 5 moles of oxygen per gram atom of metal in the ethylene polymerization catalyst.

The quantity of vinyl acetate used in the copolymerization may be varied from 0.1 to 3.0 grams vinyl acetate per gram ethylene polymer formed. The copolymerization reaction starts immediately on the addition of oxygen and vinyl acetate to the reactor containing inert liquid hydrocarbon solvent, ethylene polymer with a portion of the metal catalyst bonded thereto, and metallic catalyst residue. When the reaction is terminated, the metallic catalyst is removed from the polymer and copolymer products by techniques well-known in the art, e.g. the addition of a methanol-HCl solution to dissolve the solid catalyst followed by filtration. Another method would be to add an isopropanol-acetylacetonate-HCl mixture thereby forming a soluble complex with the metallic catalyst which is removed by filtration.

The resulting homogeneous product of the copolymerization reaction comprises a mixture of (a) copolymer of ethylene and vinylacetate (b) polyethylene homopolymer and (c) vinyl acetate homopolymer. The vinyl acetate homopolymer is readily removed by methods well known to those skilled in the art. For example the copolymerization reaction mixture can be subjected to an extraction with methanol whereby the polyvinyl acetate is dissolved therein. In addition, the remaining insoluble mixture, can thereafter be dissolved in hot xylene (140° C.) and reprecipitated by pouring the hot xylene solution into a 90% isopropanol solution whereby any polyvinyl acetate homopolymer present is redissolved and removed by filtration.

The filter residue comprising an ethylene vinyl acetate copolymer and a homopolymer of polyethylene, after drying, can be used in surface coatings having adhesive properties. It is readily dispersible in water in the presence of a surface active agent after being subjected to a chopping action reducing it to a fine particle size. The presence of the polar groups afforded by the ester linkage aids the stability of the dispersion. Additionally, the solubility properties of the copolymer make it useful as a detergent. The mixture of ethylene vinyl acetate copolymer, ethylene homopolymer and vinyl acetate homopolymer can also be used to make moldings, film, and extrusions using substantially the same equipment and technique employed for the solid polyethylenes of the prior art.

The following example will aid in explaining, but will in no way limit, the instant invention.

*Example I*

A three-necked flask fitted with a reflux condenser, stirring motor, dropping funnel and gas inlet tube, was charged under a slight pressure of nitrogen with 300 cc. of cyclohexane and 0.02 mole of aluminum triisobutyl (5.0 cc.). The flask was heated to 60° C. for one hour as ethylene gas was bubbled through the system. At the end of this period heating was discontinued and ethylene gas was bubbled through the system as it was cooled to room temperature. At this time, 0.03 mole of titanium tetrachloride (3.3 cc.) was added and immediately a brown to dark brown solid began forming. No ethylene gas was noticed coming from the exit bubbler. Polymerization of ethylene was carried out for two hours at room temperature and thereafter 0.2 mole vinyl acetate was added drop-wise while oxygen (0.02 mole; 440 cc.) was simultaneously passed through the system. The time of addition of vinyl acetate monomer and oxygen was about 5 minutes. Copolymerization was allowed to continue for 1½ hours during which time nitrogen was bubbled through the system. Upon completion of the copolymerization reaction 500 cc. of a methanol-HCl wash solution was charged to the reactor to dissolve the solid catalyst residue. After ½ hour agitation the reactor effluent was filtered and the solid homogeneous products comprising ethylene-vinyl acetate copolymer, polyethylene homopolymer, and polyvinyl acetate homopolymer were recovered and dried in a vacuum oven overnight. The dried polymer and copolymer products were then extracted for 24 hours with methanol to dissolve any polyvinyl acetate homopolymer and again filtered and dried overnight in a vacuum oven. To insure complete removal of the polyvinyl acetate homopolymer, the thus-dried products were dissolved in hot xylene (139° C.) and then reprecipitated by pouring the hot xylene solution into 1000 cc. of a 90% isopropanol solution wherein any polyvinyl acetate homopolymer will remain dissolved. The solid ethylene-vinyl acetate copolymer and polyethylene homopolymer thus formed, was filtered, dried, and submitted to infra-red analysis. Infrared analysis showed the presence of an ester linkage and indicated that polyvinyl acetate was present in the copolymer in the amount of 1–2%.

What is claimed is:
1. The process of forming a homogeneous composition consisting essentially of ethylene homopolymer and an ethylene-vinyl acetate block copolymer said copolymer having the essentially linear preformed chain of polyethylene maintained substantially intact with the vinyl acetate polymer groups attached at a terminus of said chain which comprises adding simultaneously oxygen as the sole effective catalyst and vinyl acetate monomer to a reaction zone containing polyethylene formed by subjecting ethylene to the action of a catalyst consisting essentially of a salt of a member of the group consisting of Ti, Zr, Hf, V, Nb, Ta, Cr, Mo and W and an aluminum trialkyl, said polyethylene still containing the metallic catalyst residue bonded to its terminal carbon atom in a carbon-metal bond, thereby forming a reaction product consisting of vinyle acetate homopolymer and the aforesaid homopolymer and copolymer and thereafter separating said vinyl acetate homopolymer from the reaction product; said copolymer being terminated on one end by ethylene and on the other end by vinyl acetate, said polyethlene catalyst being present in an amount equal to 0.001 to 1.0 part of said polyethylene catalyst/part polyethylene.

2. The process according to claim 1 wherein the copolymerization reaction is performed at atmospheric pressure and at a temperature in the range 20 to 70° C.

3. The process according to claim 1 wherein the amount of oxygen added is between 0.01 to 5 moles oxygen per gram atom of metal in the ethylene polymerization catalyst.

4. The process according to claim 1 wherein the amount of vinyl acetate added is from 0.1 to 3.0 grams/gram of polyethylene formed.

5. The process according to claim 1 wherein the copolymerization reaction is carried out in an inert hydrocarbon solvent.

References Cited by the Examiner

UNITED STATES PATENTS

| | | | |
|---|---|---|---|
| 2,837,496 | 6/1958 | Vandenberg | 260—878 |
| 2,947,718 | 8/1960 | Rugg et al. | 260—878 |

OTHER REFERENCES

Neumann et al., Modern Plastics, vol. 32, pp. 117–122, Aug. 1955.

MURRAY TILLMAN, *Primary Examiner.*

P. LIEBERMAN, D. J. BREZNER,
*Assistant Examiners.*